United States Patent [19]

Noguchi et al.

[11] Patent Number: 5,484,823
[45] Date of Patent: Jan. 16, 1996

[54] PHOTOPOLYMERIZABLE ADHESIVE FOR PREVENTING PEELING AND SEPARATION AT A JOINT SECTION BETWEEN FIRST AND SECOND MEMBERS OF AN INK JET PRINTING HEAD AND A METHOD OF USING THE SAME

[75] Inventors: Hiromichi Noguchi, Atsugi; Naohito Asai, Yokohama; Yuko Suga, Tokyo, all of Japan

[73] Assignee: Canon Kabushiki Kaisha, Tokyo, Japan

[21] Appl. No.: 296,182

[22] Filed: Aug. 29, 1994

Related U.S. Application Data

[63] Continuation of Ser. No. 20,453, Feb. 22, 1993, abandoned, which is a continuation of Ser. No. 627,304, Dec. 14, 1990, abandoned.

[30] Foreign Application Priority Data

Dec. 14, 1989 [JP] Japan ................. 1-322751

[51] Int. Cl.$^6$ .............. C08F 2/50; C08F 220/26; C08F 220/34; G01D 15/16
[52] U.S. Cl. .............. 522/92; 522/103; 522/121; 522/152; 522/153; 522/102
[58] Field of Search ................. 522/90, 95, 102, 522/92, 96, 111, 121, 152, 153, 103; 346/140 R

[56] References Cited

U.S. PATENT DOCUMENTS

| | | | |
|---|---|---|---|
| 4,098,918 | 7/1978 | De Majistre | 522/90 |
| 4,313,124 | 1/1982 | Hara | 346/140 R |
| 4,330,787 | 5/1982 | Sato et al. | 346/140 R |
| 4,334,234 | 6/1982 | Shirato et al. | 346/140 R |
| 4,345,262 | 8/1982 | Shirato et al. | 346/140 R |
| 4,417,251 | 11/1983 | Sugitani | 346/140 R |
| 4,459,600 | 7/1984 | Sato et al. | 346/140 R |
| 4,463,359 | 7/1984 | Ayata et al. | 346/140 R |
| 4,558,333 | 12/1985 | Sugitani et al. | 346/140 R |
| 4,688,052 | 8/1987 | Inamoto et al. | 522/102 |
| 4,688,053 | 8/1987 | Noguchi et al. | 346/140 R |
| 4,688,055 | 8/1987 | Noguchi et al. | 522/95 |
| 4,688,056 | 8/1987 | Noguchi et al. | 346/140 R |
| 4,723,129 | 2/1988 | Endo et al. | 346/1.1 |
| 4,740,796 | 4/1988 | Endo et al. | 346/1.1 |
| 4,744,827 | 5/1988 | Winkel et al. | 522/90 |
| 4,839,399 | 6/1989 | Sato et al. | 522/14 |
| 4,839,400 | 6/1989 | Sato et al. | 522/14 |
| 4,839,668 | 6/1989 | Sato et al. | 346/140 R |
| 4,839,669 | 6/1989 | Sato et al. | 346/140 R |
| 4,970,530 | 11/1990 | Komuro et al. | 346/140 R |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |
| 2158777 | 11/1985 | United Kingdom . |

Primary Examiner—Susan W. Berman
Attorney, Agent, or Firm—Fitzpatrick, Cella, Harper & Scinto

[57] ABSTRACT

A photopolymerizable adhesive comprises (A) an acrylic resin having groups represented by the formulae: —COOH, —OH and —NHCH$_2$OR (wherein R represents a hydrogen atom or an alkyl group having 1 to 4 carbon atoms), a number average molecular weight of from 3,000 to 200,000 and a glass transition temperature of at least 70° C., (B) a photopolymerizable oligomer containing at least one member selected from the group consisting of (a) an acrylate or a methacrylate of a novolak epoxy resin, (b) an acrylate or a methacrylate of a bisphenol epoxy resin and (c) an urethane acrylate of aromatic alcohol or cycloaliphatic alcohol, and (C) a photoinitiator capable of discharging radicals with the action of activation energy.

6 Claims, 3 Drawing Sheets

PHOTOPOLYMERIZABLE ADHESIVE FOR PREVENTING PEELING AND SEPARATION AT A JOINT SECTION BETWEEN FIRST AND SECOND MEMBERS OF AN INK JET PRINTING HEAD AND A METHOD OF USING THE SAME

This application is a continuation of application Ser. No. 08/020,453 filed Feb. 22, 1993, now abandoned which is a continuation of application Ser. No. 07/627,304 filed Dec. 14, 1990, now abandoned.

BACKGROUND OF THE INVENTION

1. Field of the Invention

The present invention relates to a photopolymerizable adhesive for adhering a minute portion and an ink jet recording head using the same. More particularly, the present invention is concerned with a photopolymerizable adhesive for adhering one member having a minute portion (e.g., convex portion or concave portion) to the other member.

The photopolymerizable adhesive can advantageously be used for forming a liquid path in which liquid (particularly, ink) generally is present for a path in which liquid passes and for a junction portion between the paths. Particularly, the photopolymerizable adhesive is effectively used for forming an ink jet recording head.

2. Related Background Art

In general, an adhesive for forming a desired space by laminating two members having a minute portion, such as convex portion or concave portion, is widely used in various fields.

Further, many kinds of articles having a photosensitive resin or photocured glass as a structural member are also known. Among them, an ink jet recording head formed by utilizing precise formation of the minute portion is disclosed in U.S. Pat. Nos. 4,417,251 and 4,558,333.

This technique is extremely effective and hence it has been put in practice.

It is disclosed in British Patent No. 2158777 (registered Apr. 20, 1988) and U.S. patent application Ser. No. 711,181 (filed Mar. 13, 1985) to form a liquid path by adhering a cover member to a substrate having a concave portion for the liquid path. These references disclose a technique in which when the cover member is adhered to the substrate with an adhesive, a joint area is adjusted to solve the problems of the adhesive.

On the other hand, U.S. Pat. Nos. 4,330,787 and 4,334,234 disclose that a cover plate having a recess portion for the liquid path is adhered to a substrate providing a discharge energy generation element. Particularly, U.S. Pat. No. 4,330,787 discloses a recording head formed by adhering a member having a minute portion such as an orifice plate providing a discharge port, that is, an assembled head formed by adhering a structural member to a substrate.

Generally, the liquid path has a minute portion having an average radius or one side of polygon of about 5 μm to about 200 μm and a discharge port having an average radius or one side of polygon of about 15 μm to about 100 μm is used. Since such a minute portion structure has a significant effect on fluidity of liquid and discharge state, it is known that the minute portion is required to be accurately formed with respect to desired dimensions. Therefore, it is necessary to form the minute portion structure by utilizing, as a typical material the photosensitive resin as a mold or a structural element.

Conventionally the following methods for producing an ink jet head, which has a process for laminating two substrates have been put in practice.

(1) A method in which an adhesive is subjected to screen printing.
(2) A method in which liquid type ultraviolet rays cured resin is coated to the substrate.
(3) A method in which a dry film for printed board is used as an adhesive.
(4) A method in which metal having a low-melting point is subjected to metallizing, followed by diffused junction.

The present inventors have found problems to be solved with respect to the above-mentioned conventional methods (1) to (4).

However, although the above-mentioned conventional methods (1)–(4) are unsatisfactory, they have been put in practice.

The problems of methods (1) to (4) are as follows.

In method (1), a sufficient precision cannot be obtained in view of resolution and film thickness.

In method (2), since the material has fluidity, an adhesive flows to an unrequired portion and cured there even if, for example the adhesive is ultraviolet cured. Accordingly, the adhesive flows out to the flow path, so that variations in flow path resistance and a direction of discharge may occur. Therefore, this method is undesirable for mass-production, and when a head having high density multi-discharge ports and the liquid path in which more than sixty liquid paths are formed, defective articles may be produced.

In method (3), the film-thickness of a dry film is restricted, that is, when the dry film is a photosensitive layer having a thickness of 10 μm or less, production of the dry film cannot be conducted, in practice. Further, the conventional dry films do not have satisfactory properties as adhesive of which adhesive strength is high, which does not affect the shape of a minute portion or exhibit high durability.

In method (4), it is only useful for junction of metals. Further, this method cannot be used in case where heads are made of resin.

From the foregoing, the present inventors have developed an adhesive most suitable for adhering a minute portion.

SUMMARY OF THE INVENTION

One object of the present invention is to provide a photopolymerizable adhesive for adhering a minute portion, even when a coating is thin, maintaining a high adhesive strength without injuring the shape of a minute portion.

Another object of the present invention is to provide a photopolymerizable adhesive which exhibits stable adhesiveness for a long period of time, even when the photopolymerizable adhesive is continuously exposed to liquid such as ink, while maintaining desired fluidity and discharge characteristics.

Still another object of the present invention is to provide a photopolymerizable adhesive having excellent recording characteristics such that the pohotopolymerizable adhesive exhibits excellent response properties to recording signals in an ink jet recording apparatus for discharging liquid with heat energy as a discharge energy.

A further object of the present invention is to provide an ink jet recording head formed by using the above photopolymerizable adhesive, particularly when a liquid path is a layer cured with a photosensitive resin.

A still further object of the present invention is to provide an ink jet recording apparatus in which when the above photopolymerizable adhesive is used, stable recording is performed to a recording medium capable of relatively moving to the recording head in response to information from a host or an integral recording information generator.

A furthermore object of the present invention is to provide a photopolymerizable adhesive which is effective for one of a plurality of junction members made of resin and both of them made of resins.

According to the present invention, there is provided a photopolymerizable adhesive comprising:

(A) an acrylic resin having groups represented by the formulae: —COOH, —OH and —NHCH$_2$OR (wherein R represents a hydrogen atom or an alkyl group having 1 to 4 carbon atoms), a number average molecular weight of 3,000 to 200,000 and a glass transition temperature of at least 70° C.;

(B) a photopolymerizable oligomer containing at least one member selected from the group consisting of (a) an acrylate or a methacrylate of a novolak, epoxy resin, (b) an acrylate or a methacrylate of a bisphenol epoxy resin and (c) an urethane acrylate of aromatic alcohol or cycloaliphatic alcohol; and (C) a photoinitiator capable of discharging radicals with the action of activation energy rays.

According to the present invention, there is further provided an article formed by adhering a minute portion using the above photopolymerizable adhesive and provided an ink jet recording apparatus having the above ink jet recording head.

The photocurable adhesive of the present invention has excellent properties such that when the photopolymerizable adhesive is coated on a specific surface of a part of a complicated shape, it does not flow to an unnecessary portion and when the part is a thin film having a thickness of 1 to 5 μm, the adhesive strength is high, and further the photopolymerizable adhesive is not affected by ink. Therefore, by the use of the photopolymerizable adhesive of the present invention, both of requirements in a process for adhering a minute portion and reliability in a structural member can be satisfactory. Particularly, the photopolymerizable adhesive of the present invention is an epoch-making adhesive for producing an ink jet head.

In the present invention, the photopolymerizable adhesive contains a photopolymerizable oligomer. Therefore, by optical action, a first and second junction members one of which has a transparent member are tightly jointed and the desired minute arrangement can be obtained without disturbing the shape of the minute portion (concave portion or other concave and convex portions) which is formed on at least one or both of the first and second junction members.

Particularly, it is possible to remove the unnecessary resistance regarding fluidity of durable ink of the ink jet recording head which is exposed to obtain good discharge.

The photopolymerizable adhesive of the present invention can be used also for adhering an orifice plate as a structural member for ink jet head.

DETAILED DESCRIPTION OF THE PREFERRED EMBODIMENTS

The photopolymerizable adhesive of the present invention can widely be used in various fields for forming a minute portion structure, such as channels, convex portions arranged in a space at intervals, holes or through-holes. The preferred embodiments of an ink jet recording head and an ink jet recording apparatus-produced by using the photopolymerizable adhesive of the present invention 0 are explained below.

In one aspect of the present invention there is provided a photopolymerizable adhesive for an ink jet recording head, which comprises:

(A) an acrylic resin having groups represented by the formulae: —COOH, —OH and —NHCH$_2$OR (wherein R represents a hydrogen atom or an alkyl group having 1 to 4 carbon atoms), a number average molecular weight of 3,000 to 200,000 and a glass transition temperature of at least 70° C.;

(B) a photopolymerizable oligomer containing at least one member selected from the group consisting of (a) an acrylate or a methacrylate of a novolak epoxy resin, (b) an acrylate or a methacrylate of a bisphenol epoxy resin, and (c) an urethane acrylate of aromatic alcohol or cycloaliphatic alcohol; and (C) a photoinitiator capable of discharging radicals with the action of activation energy rays.

The present invention will be explained below in detail.

(A) An Acrylic Resin

The acrylic resin (A) to be used in the present invention exhibits properties for decreasing the fluidity immediately after coating the adhesive and improves workability. Further, the shrinkage generated by the reaction of a photopolymerizable oligomer which has polymerization properties can be decreased, and by virtue of functional groups in the acrylic resin, the adhesiveness can be increased. Examples of monomers for preparing such an acrylic resin include methyl methacrylate, ethyl methacrylate, t-butylmethacrylate, dicyclopentenyl acrylate, dicyclopentenyl methacrylate, tricyclodecane methacrylate, tricyclodecaneoxyethyl methacrylate, isobornyl acrylate, isobornyl methacrylate, tetrahydrofurfuryl acrylate, cyclohexyl methacrylate, dimethylaminoethyl methacrylate, benzyl acrylate and the like.

Examples of monomers having carboxyl groups (—COOH) include acrylic acid, methacrylic acid, monoacrylic acid ester of succinic acid, monoacrylic acid ester of phthalic acid and the like.

Examples of monomers having hydroxyl groups (—OH) include 2-hydroxyethyl acrylate, 2-hydroxyethyl methacrylate, 2-hydroxy propyl methacrylate, 4-hydroxybutyl acrylate and the like.

Examples of monomers having groups represented by the formula: —NHCH$_2$OR (wherein R represents a hydrogen atom or an alkyl group having 1 to 4 carbon atoms) include N-methylolacrylamide, butoxymethylacrylamide and the like.

In the present invention, the acrylic resin (A) may be obtained, for example by polymerizing properly monomers as mentioned above. The amount of an acrylic monomer having the above-mentioned functional groups in the acrylic resin (A) is preferably in the range of 20% or less, regardless of polymerization type such as random copolymerization and graft copolymerization. When the amount of the acrylic monomer having a functional group is more than 26%, resistance to water tends to be poor.

The number average molecular weight of the acrylic resin (A) is in the range of 3,000 to 200,000, and the glass transition temperature of the acrylic resin (A) is more than at least 70° C. When the number average molecular weight and the glass transition temperature of the acrylic resin (A) is out of the above-mentioned range, sufficient coating properties or sufficient resistance to water cannot be obtained.

(B) A Photopolymerizable Oligomer

The photopolymerizable oligomer (B) to be used in the present invention is an oligomer containing at least one member selected from the group consisting of (a) an acrylate or a methacrylate of a novolak epoxy resin, (b) an acrylate or a methacrylate of a bisphenol epoxy resin, and (c) an urethane acrylate of aromatic alcohol or cycloaliphatic alcohol.

As novolak epoxy resins used for an acrylate or a methacrylate of component (a), both phenol novolak epoxy resin and cresol novolak epoxy resin may be used. When each of the epoxy resins has a condensation degree up to about 10, the difference in performance is not remarkable.

However, while an optimal degree of condensation is not specified, from the viewpoint of the synthetic reaction, the condensation degree is preferably in the range of 2 to 7.

As examples of the commercially available novolak epoxy resins, there may be used trade name of EOCN-102 (epoxy equivalent of 205 to 230), trade name of EOCN-1020 (epoxy equivalent of 93 to 205) and trade name of EPPN-201 (epoxy equivalent of 180 to 205) which are manufactured and sold by Nippon Kayaku Co., Ltd., Japan and the like.

As the bisphenol epoxy resins used as an acrylate or a methacrylate of skelton of component (b), there may be used a material having a bisphenol A epoxy resins, a bisphenol S epoxy resin, a bisphenol F epoxy resin and the like.

As the cycloaliphatic alcohols and aromatic alcohols used as a urethane acrylate of component (c), there may be used materials having a structure represented by the following formula.

Cycloaliphatic alcohols:

Aromatic alcohols:

Of these divalent alcohols, materials (3), (5) and (6) each having a skeleton of dicyclopentadiene have extremely excellent performance for the objects of the present invention. By reacting these divalent alcohols with diisocyanate and acrylic monomer having hydroxyl groups, an urethane acrylate having a terminal acryloyl groups can be obtained.

In the present invention, the urethane acrylate is synthesized as it has typically a structure represented by the following formula:

M-DI-AL-DI-M          (I)

wherein AL, DI and M represent a divalent alcohol, diisocyanate and an acrylic monomer having a hydroxyl group, respectively.

The urethane acrylate generally have a recurring structure, such as

M-DI-AL-DI-AL-DI-AL . . . AL-DI-M.

Many of commercially available urethane acrylates have such a recurring structure. However, in the present invention, the urethane acrylate having structure of formula (I) is preferred. Further, it is preferred that the urethane acrylate has an urethane linkage and the molecular weight between crosslinking points is restricted to the minimum. To obtain such a structure, half-urethane compound represented by formula M-DI is synthesized by reacting component M with component DI, and then, is further reacted with component AL.

As the diisocyanate used for producing the urethane acrylate (c), there may be mentioned tolylene diisocyanate, diphenylmethane diisocyanate, hexamethylene diisocyanate, isophorone diisocyanate, lysine diisocyanate and the like.

The acrylic monomers having hydroxyl groups, which is represented mark M in the above formula (1), include 2-hydroxyethyl acrylate, 2-hydroxyethyl methacrylate, 2-hydroxypropyl acrylate, 2-hydroxypropyl methacrylate, 3-chloro-2-hydroxy acrylate, 4-hydroxybutyl acrylate and the like.

(C) A Photoinitiator

As the photoinitiator (C) to be used in the present invention, there is no limitation as long as materials have a solubility to the above-mentioned components, radicals are generated by applying activation energy rays, such as an ultraviolet ray, and the materials are difficult to react in the dark. Examples of photoinitiators include benzil; benzoin alkyl ethers, such as benzoin isobutyl ether, benzoin isopropyl ether, benzoin-n-butyl ether, benzoin ethyl ether and benzoin methyl ether; benzophenones, such as benzophenone, benzophenone methyl ether; anthraquinones, such as 2-ethylanthraquinone and 2-t-butylanthraquinone; thioxanthones, such as 2,4-dimethylthioxanthone and 2-4-isopropylthioxanthone; acetophenones, such as 2,2-dimethoxy-2-phenylacetophenone, $\alpha,\alpha$-dichloro-4-phenoxyacetophenone, p-t-butyltrichloroacetophenone, p-t-butyldichloroacetophenone and 2,2-diethoxyacetophenone; or hydroxycyclohexylphenylketone (trade name of Irgacure 184, manufactured and sold by Ciba Geigy Corp.,), benzyldimethylketal (trade name of Irgacure 651, manufactured and sold by Ciba Geigy Corp.,), 1-(4-isopropylphenyl)-2-hydroxy-2-methylpropane-1-one (trade name of DAROCURE1116 manufactured and sold by MERCK), 2-hydroxy-2-methyl-1-phenyl-propane-1-on (trade name of DAROCURE 1173, manufactured and sold by MERCK) and others.

In the adhesive of the present invention, the characteristics of these essential components exert synergistic effect. Therefore, the adhesive is suitable for the production of an ink jet head. By the use of the adhesive of the present invention, the objects of the present invention can be attained.

In the present invention, amines or materials having alkylamine groups may be used as sensitizer in addition to the photoinitiator. Therefore, the sensitivity can be increased and the oxygen inhibition can be decreased.

Examples of the sensitizers include ethanol amine, ethyl-4-dimethylaminobenzoate, 2-dimethylamino)ethylbenzoate, p-dimethylaminobenzoic acid-n-amylester, p-dimethylaminobenzoic acid isoamylester, n-butylamine, triethylamine, diethylaminoethyl methacrylate, 4,4-bis(diethylamino)benzophenone, 4-dimethylaminoacetophenone, N-ethyldiethanolamine and the like.

The amounts ratio with respect to the acrylic resin (A), photopolymerizable oligomer (B) and photoinitiator (C), which are contained in the photopolymerizable adhesive as essential components, are as follows. The ratios of (A) to (B) is preferably in the range of 100:80 to 100:250 (weight ratio) and the ratio of [(A)+(B)] to (C) is preferably in the range of from 100:3 to 100:10 (weight ratio).

The photopolymerizable oligomer (B) contains a mixture of at least one of ester of component (a) and/or ester of component (b), and an acrylate of component (c). The amount ratio of oligomer E to oligomer U is preferably in the range of 70:30 to 50:50 (weight ratio), wherein oligomer E contains at least one of components (a) and (b) and oligomer U contains component (c). In the present invention, the oligomer E is used preferably in an amount of 50% by weight or more. On the other hand, when the amount of oligomer U is in the range of 30% to 50% by weight, it works best.

Further, low-viscosity monomers (reactive diluent) which are not necessarily in the present invention, but, if desired, the monomers may be arbitrarily selected and used.

Examples of the low-density monomers include 1,3-butanediol di(meth)acrylate, 1,4-butanediol di(meth)acrylate, 1,6-hexanediol di(meth)acrylate, neopentylglycol di(meth)acrylate, polyethyleneglycol 400 diacrylate, hydroxy pivalic acid ester neopentylglycol diacrylate, dicyclopentenyl dioxyethyl(meth)acrylate, trimethylolpropane tri(meth)acrylate, pentaerythritol tri(meth)acrylate, dipentaerythritol hexacrylate, 2-hydroxyethyl acrylate, tetrahydrofurfuryl acrylate, phenoxyethyl acrylate and so on. These low-viscosity monomers may be used in an amount of 5 parts by weight to 30 parts by weight, based on 100 parts by weight of the total amount of the oligomer E and the oligomer U.

If desired, the following additives may be optionally added to the photopolymerizable adhesive of the present invention. As the additives, there may be mentioned, for example, hydroquinones for suppressing dark reaction stabilizers, such as paramethoxyphenols; colorants, such as dyes and pigments; extender pigments, such as silica, talc, alumina and clay; fire retardant, silane coupling agent for improving adhesiveness.

When the resin composition of the present invention is used as a thin film having a thickness of 10 μm or less, it is preferred that the resin composition is dissolved in relatively slow-drying organic solvent. Examples of the slow-drying organic solvents include ethylene glycol derivatives, such as ethyl cellosolve acetate and butyl cellosolve acetate, methyl isobutyl ketone, toluene, xylene, N-methylpyrolidone, propylene carbonate and the like. Further, the resin composition of the present invention may be used for a photosensitive layer having a thickness of 5 μm to 100 μm, which layer is so-called photosensitive dry film.

The methods for producing an ink jet nozzle by using the photopolymerizable adhesive of the present invention are explained below.

Application Method 1

Figure 2:
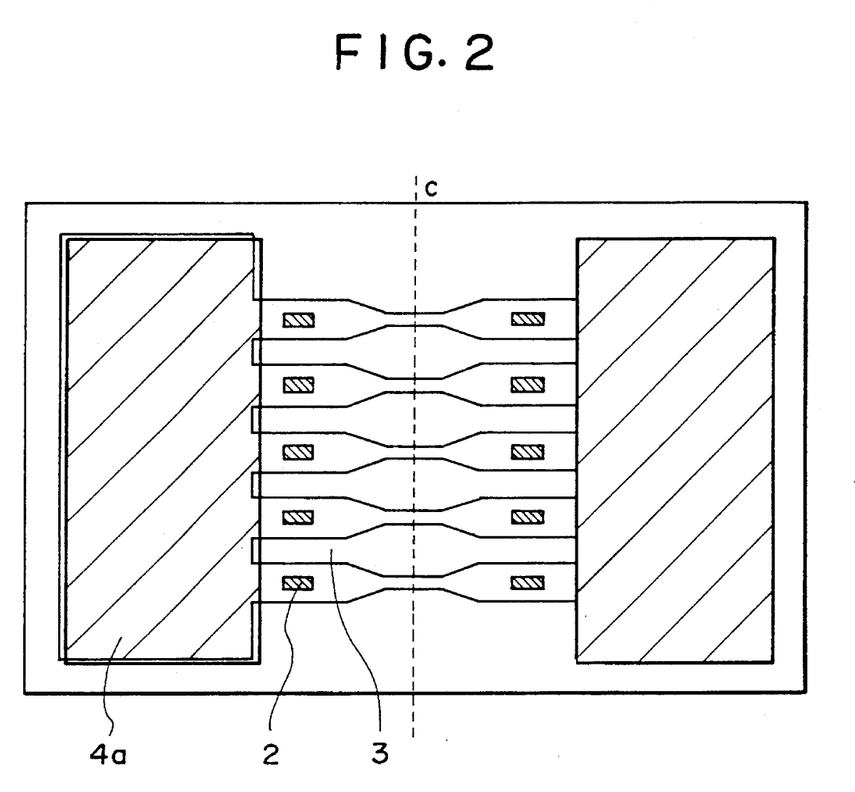
FIG. 2 is a plan view showing a substrate for the ink jet head.
Figure 3A:
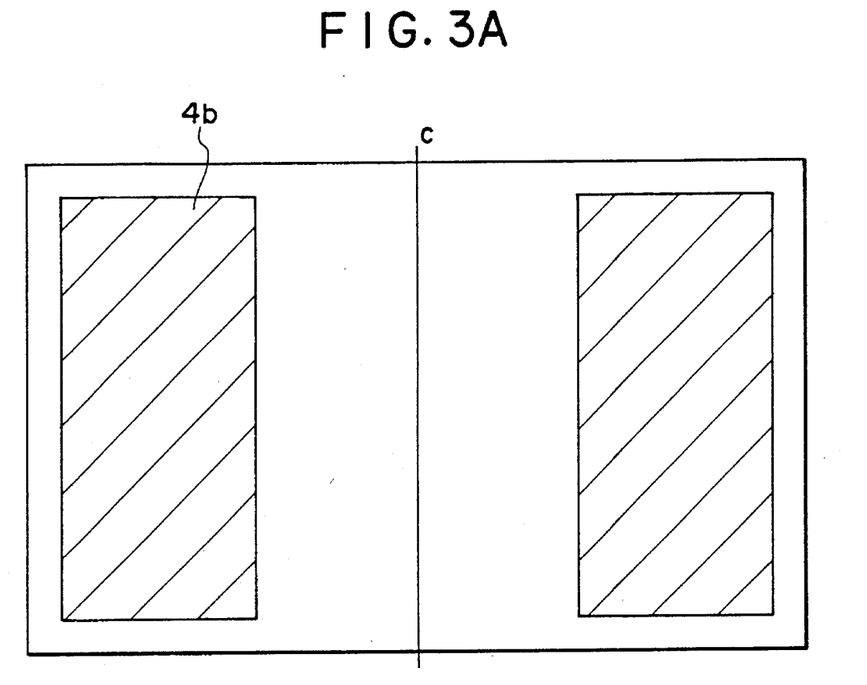
FIGS. 3A and 3B are a plan view and a front view, respectively, showing substrates for laminating with the substrate as shown in FIG. 2.
Figure 3B:
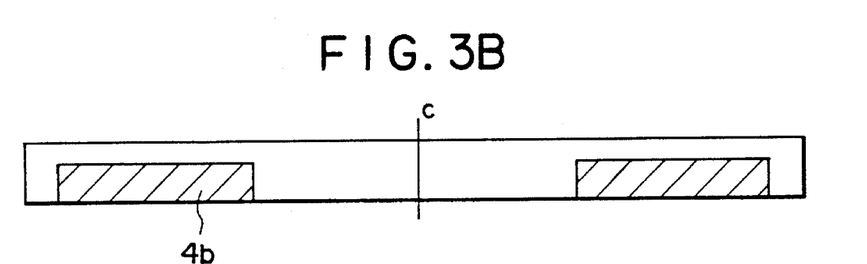

Substrate 1a having discharge energy generating element 2, liquid path wall 3 and ink liquid chamber 4a as shown in FIG. 2 and activation energy rays penetrable substrate 1b having ink liquid chamber 4b (in which recording liquid is stored, as shown in FIGS. 3A and 3B, are prepared. The photopolymerizable adhesive of the present invention is dissolved in an appropriate solvent to prepare a liquid adhesive. The resultant adhesive has, for example, a viscosity of about 100 cps and a solid content of about 30% by weight. Thus prepared liquid adhesive is coated on the surface of substrate 1b by means of a roll coater so as to have thickness of the film of about 6 μm. Then, substrate 1b is dried at about 80° C. for about 20 minutes. The resultant substrate 1b is registered and melt-bonded under pressure on a hot plate with substrate 1a. Then, using a ultraviolet-ray-exposure device, the substrate is exposed to ultraviolet rays from above and cured.

Figure 1:
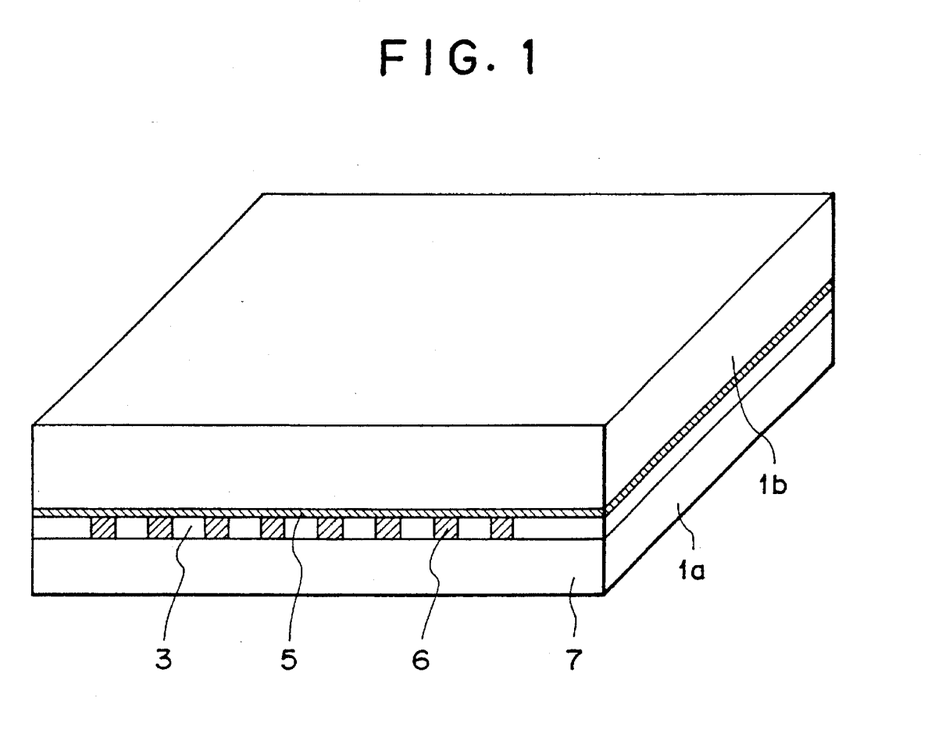
FIG. 1 is a perspective view showing an ink jet head produced by using the photopolymerizable adhesive of the present invention.

Thus, the flow path wall of substrate 1a is jointed to substrate 1b at the same time the flow path is formed as a nozzle or a head. Two substrates are jointed. In the above-mentioned sequence process, the fluidity of the present adhesive is suppressed, so that hanging down of the adhesive from the flow path wall can be reduced to a minimum. FIG. 1 is a typical diagrammatic perspective view showing an ink jet head produced by the above-mentioned process.

Application Method 2

The present adhesive is dissolved in methyl ethyl ketone to prepare a liquid adhesive. The prepared liquid adhesive is coated on a polyethylene terephthalate made film having a thickness of about 25 μm so that the thickness of the resultant film becomes about 5 μm. On the other hand, a polyethylene made film having a thickness of 50 μm is laminated to a photosensitive layer, to thereby prepare a dry film sandwiched between two films. The thus prepared dry film is laminated to substrate 1b in application method 1, and then, the photosensitive layer on the ink liquid room is cut off with a cutter. The resultant substrate 1b is registered with substrate 1a, melt-bonded under pressure on a hot plate.

Using a ultraviolet-ray-exposure device, the substrate is exposed to a ultraviolet ray from above and cured.

Thus, the film path wall of substrate 1a adheres to substrate 1b at the same time the flow path formed to a nozzle. In the above-mentioned sequence process, the fluidity of the present adhesive is suppressed, so that hanging down of the adhesive from the flow path wall can be reduced to a minimum.

Accordingly, the photopolymerizable adhesive of the present invention is useful for producing, particularly, an ink jet head. The advantages of the present adhesive are as follows.

(1) Joining of a minute portion of a substrate can easily be conducted, so that a good ink jet recording head capable of flying droplets in a straight line can be obtained.

(2) A multi-nozzle ink jet recording head can easily be produced.

(3) The mass-production of an ink jet recording nozzle can be attained.

(4) The durability of the ink jet recording nozzle can be improved and the reliability of a system can be increased.

EXAMPLES

The present invention will be described in more detail with reference to the following Synthesis Examples, Examples and Comparative Examples, which should not be construed as limiting the scope of the present invention.

Synthesis Example 1

Methyl methacrylate, methacrylic acid, and 2-hydroxypropylmethacrylate in weight ratios of 85:5:10 were subjected to solution polymerization in a mixture solvent of xylene and methyl cellosolve in a weight ratio of 50:50, to thereby obtain a linear polymer (hereinafter referred to as "LP-1") having a number average molecular weight (Mn) of about 40,000, a weight average molecular weight (Mw) of about 130,000 and a glass transition temperature (Tg) of 80° C.

Synthesis Example 2

Cresol novolak epoxy resin (trade name of EOCN-102, manufactured and sold by Nippon Kayaku Co., Ltd., Japan, and having epoxy equivalent of from 205 to 230, was dissolved in xylene. Then, using tetrabutylammonium chloride as a catalyst, acrylic acid was dropwise added to the resultant mixture solution of 80° C. to advance a reaction, to thereby obtain an acrylic acid ester of an epoxy resin (hereinafter referred to as "EPA-1").

Synthesis Example 3

To toluene solution of tolylene diisocyanate was dropwise added 2-hydroxyethyl methacrylate so as to have a ratio of the number of moles of NCO groups to the number of moles of OA group of 1:0.5 to advance a reaction. Thus, a compound having isocyanate groups and acryloyl groups was obtained. Then, to the solution was added toluene solution of hydrogenated bisphenol A (manufactured and sold by Kyoeisha Chemical Co., Ltd., Japan) and the reaction was conducted at 70° C. for 4 hours. Then, to the resultant solution was added dibutyltindilaurate and the reaction was conducted for 3 hours, to thereby obtain an urethane acrylate (hereinafter, referred to as UA-1) of hydrogenated bisphenol A.

Example 1

An adhesive of the formulation indicated in Table 1 was prepared.

TABLE 1

| Example 1 | Formulation (parts by weight) |
| --- | --- |
| a | |
| acrylic resin LP-1 | 100 |
| b | |
| epoxy acrylate EPA-1 | 120 |
| urethane acrylate UA-1 | 80 |
| c | 8 |
| photoinitiator Irgacure | |
| solvent | 300 |
| ethylcellosolve | |
| acetate | |

AS shown in FIG. 1, substrate 1a having a heater as a discharge energy generated element and a flow path wall which is preferably a cured layer wall of a photosensitive resin and substrate 1b of top plate glass (or transparent resin) having concave portions for ink liquid room were prepared. On the junction side of top board glass 1b or on the surface of nozzle side, the adhesive composition of Example 1 was wet-coated so as to have a film thickness of 3.5 μm by means of a roll coater. Then, the resultant composition was dried in an oven of 80° C. for 5 minutes to remove the solvent.

Then, substrate 1a and top board glass 1b were registered and the temperature was increased up to 80° C. to conduct a melt-bonding. The resultant substrate was exposed to ultraviolet rays to cure the adhesive from above. The ultraviolet ray used is a ultra high-pressure mercury vapor lamp. The energy strength of the ultraviolet rays was 10 mW/cm$^2$ in the neighborhood of 365 nm and the exposure time was 4 minutes. After adhering, by means of an ultra high-pressure mercury vapor lamp having an energy strength of 55 mW/cm$^2$ in the neighborhood of 365 nm, ultraviolet-ray-exposure was conducted for 6 minutes for post-curing. Thus, the adhesive of substrate 1a and top board glass 1b was terminated. The laminated substrate was cut off by means of slicing machine for semiconductor at the position of the center line represented mark C shown in FIGS. 2 and 3. As shown in FIG. 1, two pieces of ink jet nozzle were obtained.

Reliability Test 30 pieces of ink jet heads were produced in the same manner as in Example 1 and the following reliability tests were conducted.

(1) Temperature Cycling Test

Using 10 pieces of heads, temperature cycling test was conducted. The temperature was varied up and down with 10 cycles between −15° C. and 80° C.

(2) Drop Impact Test

Each of 10 pieces of head was dropped down from 60 cm-high place.

(3) Ink Immersion Test

Each of 10 pieces of heads was immersed in a mixture solution of ethylene glycol and water in a weight ratio of 50:50 at 80° C. for 300 hours.

As a result, in the above tests (1) to (3), peeling and separation in the junction portions were not observed.

Examples 2 to 6

Adhesives were prepared in formulations indicated in Tables 2 to 5 and ink jet nozzles were produced in the same manner as in Example 1.

Comparative Examples 1 to 4

Substantially the same procedure as in Example 1 was repeated except that commercially available ultraviolet ray curable adhesive shown in Table 7 was used instead of the adhesive of the present invention, to thereby produce ink jet nozzles.

Reliability tests were conducted in the same manner as mentioned above with respect the ink jet nozzles produced in Examples 2 to 6 and Comparative Examples 1 to 4. The result are shown in Table 8.

TABLE 2

|  | Example 2 | Example 3 | Example 4 | Example 5 | Example 6 |
|---|---|---|---|---|---|
| a acrylic resin |  |  |  |  |  |
| LP-2 | 100 |  |  |  | 100 |
| LP-3 |  | 100 |  |  |  |
| LP-4 |  |  | 100 |  |  |
| LP-5 |  |  |  | 100 |  |
| b epoxy acrylate |  |  |  |  |  |
| EPA-2 | 56 |  |  |  | 120 |

TABLE 2-continued

|  | Example 2 | Example 3 | Example 4 | Example 5 | Example 6 |
|---|---|---|---|---|---|
| EPA-3 |  | 40 |  |  |  |
| EPA-4 |  |  | 175 |  |  |
| EPA-5 |  |  |  | 125 |  |
| urethane acrylate |  |  |  |  |  |
| UA-2 | 24 |  |  |  |  |
| UA-3 |  | 40 |  |  |  |
| UA-4 |  |  | 75 |  | 100 |
| UA-5 |  |  |  | 125 |  |
| c photo-initiator |  |  |  |  |  |
| BP | 5 | 5 |  |  |  |
| DAA | 1 | 1 |  |  |  |
| Irgacure 651 |  |  | 6 |  | 6 |
| Irgacure 184 |  |  |  | 6 |  |
| Solvent ECA | 350 | 350 | 450 | 450 | 400 |

TABLE 3

(LP-2–LP-5 Components)

|  | Formulation of monomers | number average molecular weight | Tg (°C.) |
|---|---|---|---|
| LP-2 | MMA/TCDMA/AA 50/40/10 | 65,000 | 115 |
| LP-3 | MMA/DCPA/DMA 60/25/15 | 60,000 | 90 |
| LP-4 | MMA/BZA/N-MAN 70/10/20 | 20,000 | 87 |
| LP-5 | MMA/DCPA/N-MNN 70/15/15 | 35,000 | 93 |

TABLE 4

(EPA-2–EPA-5 Components)

|  | Epoxy resin | Acrylic monomer |
|---|---|---|
| EPA-2 | Epikoto - 152 | Acrylic acid |
| EPA-3 | Epikoto - 828 | Acrylic acid |
| EPA-4 | Epicron 830F | Acrylic acid |
| EPA-5 | EOCN - 1025 | Acrylic acid |

TABLE 5

(UA-2–UA-5 Components)

|  | Polyvalent alcohol | Diisocyanate | Acryloyl monomer containing hydroxyl group |
|---|---|---|---|
| UA-2 |  | Tolylene diisocyanate | 2-HEMA |

TABLE 5-continued

| | | | |
|---|---|---|---|
| UA-3 | (structure: phthalate-linked bis(norbornane-CH2OH) with COCH2 groups) | Tolylene diisocyanate | 2-HEMA |
| UA-4 | HO2HC—[norbornane]—CH2OH | Diphenylmethane diisocyanate | 2-HEMA |
| UA-5 | HO—[phenyl]—OCO—[phenyl]—OH | Isophorone diisocyanate | 2-HEMA |

(List of Abbreviations)

BP: benzophenone
DAA: dimethylaminoacetophenone
Irgacure 651: benzyldimethylketol (manufactured and sold by Ciba Geigy Corp.)
Irgacure 184: dihydroxycyclohexyl phenyl ketone (manufactured and sold by Ciba Geigy Corp.)
ECA: ethylcellosolve acetate
MMA: methylmethacrylate
TCDMA: tricyclodecane methacrylate
AA: acrylate
DCPA: dicyclopentenyl acrylate
DMA: dimethylaminoethyl methacrylate
BZA: benzyl acrylate
N-MAN: N-methylolacrylamide
2-HEMA: 2-hydroxyethyl methacrylate
MMA: methacryl acid
Epikoto-152: phenolic novolak epoxy resin (manufactured and sold by Yuka Shell Epoxy Kabushiki Kaisha, Japan)
Epikoto-828: bisphenol A epoxy resin (manufactured and solve by Yuka Shell Epoxy Kabushiki Kaisha, Japan)
Epicron 830F: bisphenol F epoxy resin (manufactured and sold by Dainippon Ink & Chemicals, Inc., Japan)
EOCN-1025: cresol novolak epoxy resin (manufactured and sold by Nippon Kayaku Co., Ltd., Japan)

TABLE 7

(Composition of the Comparative Example)

| Trade name | Types of material | Maker | Comparative Example 1 | 2 | 3 | 4 |
|---|---|---|---|---|---|---|
| Photobond 310 | acryl type | Sunrise Meisei | 30 | | | |
| Loctite 350 | acryl type | Loctite Corp., | | 30 | | |
| Hard Rock OP-150 | en-thiol type | Denki Kagaku Kogyo Kabushiki Kaisha, Japan | | | 30 | |
| Alontite BU-230 | acryl type | Toagosei Chemical Industry Co., Ltd., Japan | | | | 30 |
| ECA | Diluent | — | 70 | 70 | 70 | 70 |

TABLE 8

(Results of the reliability test)

| | Temperature cycling test | Drop impact test | Ink immersion test |
|---|---|---|---|
| Example 2 | 5/5 | 5/5 | 5/5 |
| Example 3 | 5/5 | 5/5 | 5/5 |
| Example 4 | 5/5 | 5/5 | 5/5 |
| Example 5 | 5/5 | 5/5 | 5/5 |
| Example 6 | 5/5 | 5/5 | 5/5 |
| Comparative Example 1 | 3/5 | 3/5 | 0/5 |
| Comparative Example 2 | 2/5 | 2/5 | 0/5 |
| Comparative Example 3 | 2/5 | 1/5 | 0/5 |
| Comparative Example 4 | 2/5 | 2/5 | 0/5 |

The present invention brings about excellent effects without degrading the characteristics particularly in a type of recording head in which ink is discharged by sudden state change caused by thermal energy generated by electrothermal converted elements and optical energy and recording apparatus proposed by Canon, Inc., among the ink jet recording systems.

As regards the typical construction and principle thereof, use may preferably be made of the basic principles disclosed, for example, U.S. Pat. No. 4,723,129 and U.S. Pat. No. 4,740,796. This system is applicable to both of the so-called on-demand type and the so-called continuous type, and particularly in the case of the on-demand type, the present invention is effective because at least one driving signal corresponding to recording information and providing a rapid temperature rise exceeding nuclear boiling is applied to electro-thermal conversion members disposed correspondingly to a sheet or liquid paths retaining liquid (ink) therein, whereby heat energy is generated in the electrothermal conversion elements and film boiling is caused on the heat-acting surface of the recording head with a result that a bubble in the liquid (ink) corresponding at one to one to said driving signal can be formed. By the growth and contraction of this bubble, the liquid (ink) is discharged through a discharge opening to thereby form at least one droplet. If the driving signal is in the form of pulse, the growth and contraction of the bubble appropriately will take place on the spot and therefore, excellent discharge of the liquid (ink), particularly in responsiveness, can be accomplished, and this is more preferable. As this driving signal in the form of pulse, one as described in U.S. Pat. No. 4,463,359 or U.S. Pat. No. 4,345,262 is suitable. More excellent recording can be accomplished if the conditions described in U.S. Pat. No. 4,313,124 which discloses an invention relating to the temperature rise rate of said heat-acting surface are adopted.

As regards the construction of the recording head, besides the construction comprising a combination of discharge ports, liquid paths and electro-thermal conversion members as disclosed in the above-mentioned patents (straight liquid flow-paths or right-angled liquid flow paths), the construction using U.S. Pat. No. 4,558,333 and U.S. Pat. No. 4,459,600 which disclose a construction in which the heat-acting portion is disposed in a bent area is also covered by the present invention. In addition, the present invention will also be effective if it adopts a construction based on Japanese Laid-Open Patent Application No. 59-123670 which discloses a construction in which a slit common to a plurality of electro-thermal conversion members is the discharge portion of the electro-thermal conversion members or Japanese Laid-Open Patent Application No. 59-138461 which discloses a construction in which an opening for absorbing the pressure wave of heat energy corresponds to a discharge portion.

Further, the present invention is effective paticularly for the full line type recording head having a length corresponding to the width of the largest recording medium and a number of liquid paths can be formed without an disturbance.

In addition, the present invention is effective for a case where use is made of an interchangeable chip type recording head which enables the electrical connection to an apparatus body or the supply of ink from the apparatus body to be accomplished by being mounted on the apparatus body or a recording head of the cartridge type in which a cartridge is integrally provided in the recording head itself.

Also, to the apparatus is added with recovery means, preliminary auxiliary means and the like for the recording head which is provided as the construction of the recording apparatus of the present invention, the present invention is preferable because the recovery means can surely operate. Specifically mentioning these, they include capping means, cleaning means and pressing or suction means for the recording head, and preheating means provided by electro-thermal conversion members or a heating element discrete therefrom or a combination of these, and it is also effective for accomplishing stable recording to perform a preliminary discharge mode in which discharge discrete from that for recording is effected.

Further, the recording mode of the recording apparatus is not limited to a recording mode only in the main color such as black, but the present invention is also very effective for an apparatus provided with at least one of different plural colors or full color by mixed colors although the recording head may be constructed as a unit or provided by a combination of a plurality of heads.

In the embodiments of the present invention described above, liquid ink has been described as being used, but in the present invention, use may also be made of ink which is in liquid phase at room temperature or ink which is softened at room temperature. In the above-described ink jet apparatus, it is usual to effect temperature adjustment of the ink itself within the range of 30° C. to 70° C. and effect temperature control so that the viscosity of the ink may be within a stable discharge range and therefore, the ink may be one which forms the liquid phase when the recording signal used is imparted. In addition, the temperature rise by heat energy may be prevented by being positively used as the energy for the phase change of the ink from the solid phase to the liquid phase, or ink which solidifies when it is left as it is may be used with a view to prevent the evaporation of the ink, and in any case, the use of ink having the nature of being liquefied only by heat energy, such as ink which is liquefied by the application of heat energy conforming to a recording signal and is discharged in the form of ink liquid or ink which already begins to solidify at a point of time whereat it arrives at a recording medium is also applicable to the present invention. In such a case, the ink may be in a form opposed to electro-thermal conversion members in the state as described in Japanese Laid-Open Patent Application No. 54-56847 or Japanese Laid-Open Patent Application No. 60-71260 wherein the ink is retained as liquid or solid in the recesses of a porous sheet or through-holes. In the present invention, what is most effective for the above-described kinds of inks is what executes the above-described film boiling system.

What is claimed is:

1. A photopolymerizable adhesive comprising:

(A) an acrylic resin having groups represented by at least one of the formulae: —COOH, —OH and —NHCH$_2$OR (wherein R represents a hydrogen atom or an alkyl group having 1–4 carbon atoms), a number average molecular weight of 3,000 to 200,000 and a glass transition temperature of at least 70° C.;

(B) a photopolymerizable oligomer mixture containing at least one member selected from the group consisting of (i) (a+c), (ii) (b+c) or (iii) (a+b+c) where a is an acrylate or a methacrylate of a novolak epoxy resin, b is an acrylate or a methacrylate of a bisphenol epoxy resin and c is a urethane acrylate of an aromatic divalent alcohol or a cycloaliphatic divalent alcohol, said urethane acrylate having at least four urethane bonds per molecule of urethane acrylate; and (C) a photoinitiator capable of discharging radicals by the action of activation energy rays.

2. An adhesive according to claim 1, wherein said acrylic resin has —NHCH$_2$OR group (wherein R represents a hydrogen atom or an alkyl group having one to four carbon atoms).

3. An adhesive according to claim 1, wherein said photopolymerizable oligomer mixture is an oligomer mixture including acrylic acid ester or methacrylic acid ester of novolak epoxy resin and urethane acrylate of aromatic divalent alcohol or cycloaliphatic divalent alcohol.

4. A photopolymerizable adhesive comprising:

(A) an acrylic resin having groups represented by at least one of the formulae: —COOH, —OH and —NHCH$_2$OR (wherein R represents a hydrogen atom or an alkyl group having 1–4 carbon atoms), a number average molecular weight of 3,000 to 200,000 and a glass transition temperature of at least 70° C.;

(B) a photopolymerizable oligomer mixture containing at least one member selected from the group consisting of (i) (a+c), (ii) (b+c) or (iii) (a+b+c) where a is an acrylate or a methacrylate of a novolak epoxy resin, b is an acrylate or a methacrylate of a bisphenol epoxy resin and c is a urethane acrylate represented by the formula M(DI-AL-)$_n$DI-M, wherein M is an acrylic monomer having a hydroxyl group, DI is a diisocyanate group, AL is a cycloaliphatic or aromatic divalent alcohol and n is a positive integer; and (C) a photoinitiator capable of discharging radicals by the action of activation energy rays.

5. An adhesive according to claim 4, wherein said acrylic resin has —NHCH$_2$OR group (wherein R represents a hydrogen atom or an alkyl group having one to four carbon atoms).

6. An adhesive according to claim 4, wherein said photopolymerizable oligomer mixture is an oligomer mixture including acrylic acid ester or methacrylic acid ester of novolak epoxy resin and the urethane acrylate.

* * * * *

UNITED STATES PATENT AND TRADEMARK OFFICE
CERTIFICATE OF CORRECTION

PATENT NO. : 5,484,823

DATED : January 16, 1996

INVENTOR(S) : HIROMICHI NOGUCHI ET AL.

It is certified that error appears in the above-indentified patent and that said Letters Patent is hereby corrected as shown below:

ON TITLE PAGE

In [57] ABSTRACT: line 10, "an" should read --a--.

COLUMN 1

Line 9, "abandoned" should read --abandoned,--.

COLUMN 4

Line 15, "apparatus-produced" should read --apparatus produced--.
Line 16, "0" should be deleted.

COLUMN 5

Line 5, "26%," should read --20%,--.

UNITED STATES PATENT AND TRADEMARK OFFICE
CERTIFICATE OF CORRECTION

PATENT NO. : 5,484,823
DATED : January 16, 1996
INVENTOR(S) : HIROMICHI NOGUCHI ET AL.

It is certified that error appears in the above-indentified patent and that said Letters Patent is hereby corrected as shown below:

COLUMN 7

Line 38, "2-dimethylamino)ethylbenzoate," should read --2-(dimethylamino)ethylbenzoate,--.
Line 47, "ratios" should read --ratio--.

COLUMN 9

Line 55, "Japan," should read --Japan),--.
Line 56, "and" should be deleted.

COLUMN 10

Line 31, "AS" should read --As--.

COLUMN 13

Line 34, "solve" should read --sold--.

UNITED STATES PATENT AND TRADEMARK OFFICE
CERTIFICATE OF CORRECTION

PATENT NO. : 5,484,823
DATED : January 16, 1996
INVENTOR(S) : HIROMICHI NOGUCHI ET AL.

It is certified that error appears in the above-indentified patent and that said Letters Patent is hereby corrected as shown below:

COLUMN 15

Line 4, "nuclear" should read --nucleate--.
Line 45, "an" should read --a--.

Signed and Sealed this

Ninth Day of July, 1996

Attest:

BRUCE LEHMAN

Attesting Officer    Commissioner of Patents and Trademarks